United States Patent [19]
Shinozaki

[11] Patent Number: 5,680,469
[45] Date of Patent: Oct. 21, 1997

[54] METHOD OF INSERTION OF NOISE AND APPARATUS THEREOF

[75] Inventor: Koji Shinozaki, Tokyo, Japan

[73] Assignee: NEC Corporation, Tokyo, Japan

[21] Appl. No.: 572,063

[22] Filed: Dec. 14, 1995

[30] Foreign Application Priority Data

Dec. 16, 1994 [JP] Japan .................................. 6-313384

[51] Int. Cl.$^6$ .................................................. H04B 15/00
[52] U.S. Cl. ........................... 381/94; 375/296; 395/2.35
[58] Field of Search ........................... 381/94, 73.1, 77,
381/80; 395/2.35, 2.27, 2.1; 370/111; 455/222,
68, 70; 375/244, 285, 295, 296, 346, 316

[56] References Cited

U.S. PATENT DOCUMENTS

| | | | |
|---|---|---|---|
| 3,735,048 | 5/1973 | Tomsa et al. | 370/111 |
| 3,995,115 | 11/1976 | Kelly | 395/2.14 |
| 5,060,269 | 10/1991 | Zinser | 395/2.27 |
| 5,436,899 | 7/1995 | Fujino et al. | 370/80 |
| 5,533,133 | 7/1996 | Lamkin et al. | 381/94 |
| 5,539,858 | 7/1996 | Sasaki et al. | 395/2.35 |
| 5,559,832 | 9/1996 | Laird | 375/244 |

FOREIGN PATENT DOCUMENTS

| | | |
|---|---|---|
| 60-107933 | 6/1985 | Japan . |
| 4-17421 | 1/1992 | Japan . |

Primary Examiner—Curtis Kuntz
Assistant Examiner—Ping W. Lee
Attorney, Agent, or Firm—Sughrue, Mion, Zinn, Macpeak and Seas

[57] ABSTRACT

Improvements of a method and apparatus for insertion of a pseudo noise into a silent period between an audible period and a next audible period in digital audio communication between a transmitter 10 and a receiver 11. In the transmitter 10, level measuring circuit 1 measures the level of an incoming audio signal, and comparator 2 compares the measured level value with a predetermined reference value and outputs a binary signal representing an audio period or a silent period. First selector 4 selects, in an audio period, the input audio signal 21 but selects, in a silent period, the input audio signal 21 in a lower level, and outputs the selected signal as transmission data 22. First delay circuit 3 delays the output of comparator 2 by one word interval and outputs the delayed signal as a data enable signal 23. In the receiver, holding circuit 5 holds reception data 25 at each time when the enable signal 23 turns to a silent period, and attenuator 7 adjusts the level of a noise signal generated by noise generator 6 to a predetermined pseudo noise level corresponding to the level held in holding circuit 5. Second selector 9 outputs the reception data delayed by a one word interval by second delay circuit 8 or the pseudo noise signal corresponding, to data enable signal 23.

5 Claims, 4 Drawing Sheets

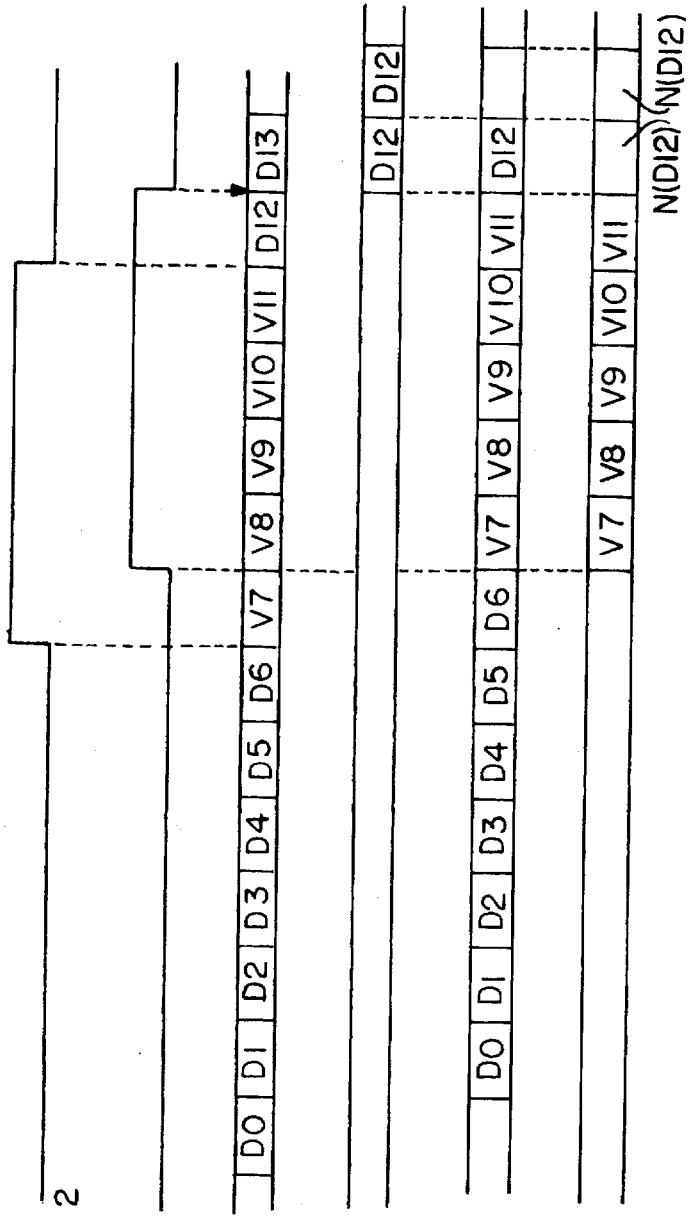

31 AUDIBLE PORTION
32 HANGOVER PORTION

METHOD OF INSERTION OF NOISE AND APPARATUS THEREOF

BACKGROUND OF THE INVENTION

1. Field of the Invention

This invention relates to a digital audio communication apparatus, and more particularly to a digital audio communication apparatus which includes a transmitter and a receiver and wherein an audio signal is transmitted intermittently only in an audible condition in which sound is present and pseudo noise is inserted into a silent period interposed between an audible period and a next audible period of the audio signal to communicate the audio signal.

2. Description of the Related Art

In a communication system which has a limited transmission capacity such as satellite communication, a communication method wherein a signal is transmitted intermittently only in audible periods in which sound is present whereas no signal is communicated in silent periods is employed to utilize a channel effectively and save the power. In an application of the type just described, since no sound is present in a silent period interposed between an audible period and a next audible period, the noise level varies greatly, which is disagreeable to the hearing of the person. Therefore, frequently a pseudo noise of a certain level is intentionally inserted into silent periods in a reception side circuit to moderate the disagreeable feeling.

FIG. 4 is a diagrammatic view illustrating a relationship between incoming sound and a control signal which indicates presence or absence of sound. The control signal for distinguishing an audio input signal illustrated in FIG. 4(a) whether presence or absence of sound usually has hangover portions 32 at the rear sides of transmitter individual audible portions 31 by a time interval corresponding to a time constant called hangover time as indicated by hatched line portions in FIG. 4(b). Accordingly, it is possible to control the insertion of a pseudo noise into silent periods on the reception side utilizing hangover portions 32.

FIG. 1 is a block diagram showing a construction of the reception side of a conventional digital audio communication apparatus.

The reception side noise insertion circuit shown in FIG. 1 includes level measuring circuit 41, holding circuit 42, noise generator 43 and selector circuit 44. The level of incoming signal 46 is measured by level measuring circuit 41, and a result of the measurement is outputted to holding circuit 42.

When control signal 45 indicates an audible condition, selector circuit 44 selects incoming signal 46 and outputs incoming signal 46 as reproduced signal 47. Holding circuit 42 holds the output of level measuring circuit 41 at each timing to turn control signal 45, which indicates the distinction of an audible period or a silent period, to a silent period. Noise generator 43 outputs noise of a level equal to the value held by holding circuit 42, and the noise is inputted to selector circuit 44. When control signal 45 indicates a silent condition, the output of selector circuit 44 is changed over from incoming signal 46 to the output of noise generator 43. Accordingly, when control signal 45 indicates an audible period, incoming signal 46 is outputted as reproduced signal 47, but when control signal 45 indicates a silent period, the output signal of noise generator 43 equal to the noise level which was present in hangover time period 32 of the transmission side is outputted as reproduced signal 47.

The conventional pseudo noise insertion method described above is disadvantageous because the quite costly means for measuring the noise level of the noise included in an end portion of each audible period is required for the reception side and signal processing hardware similar to the audio signal level measurement means which is provided in the transmission side must be provided also on the reception side.

SUMMARY OF THE INVENTION

It is an object of the present invention to provide a method of insertion of pseudo noise and an apparatus thereof by which the necessity for signal processing hardware for measurement of a noise signal level on the reception side is eliminated to prevent a possible increase in cost.

In order to attain the object described above, according to an aspect of the present invention, there is provided a method of insertion of pseudo noise for a digital audio communication apparatus which includes a transmitter 10 and a receiver 11 and wherein an audio signal is transmitted intermittently only in an audible period in which sound is present and pseudo noise is inserted into a silent period interposed between an audible period and a next audible period of the audio signal to communicate the audio signal, comprising the steps performed by said transmitter 10 of:

measuring a level of an incoming audio signal 21 and outputting the measured level value;

comparing the level value of the measured audio signal with a predetermined reference value in magnitude and outputting a data enable signal 23 representing a result of the comparison; and selecting, when the signal representing the result of the comparison indicates that the level of the incoming audio signal is higher than the reference value, the incoming audio signal 21, but selecting, when the signal representing the result of the comparison indicates that the level of the incoming audio signal is lower than the reference value, the incoming audio signal (21) indicating lower level and outputting the selected value as transmission data 22; and the steps performed by said receiver 11 of:

receiving the transmission data 22 from said transmitter 10 as reception data 25 together with a data enable signal 23 and holding the reception data 25 at a time when the data enable signal 23 turns from a signal indicating the higher level to the lower level;

generating a pseudo noise signal;

adjusting a level of the generated pseudo noise signal to a predetermined pseudo noise level value;

delaying the reception data 25 for a predetermined timing; and selecting, when the data enable signal 23 indicates that the value of the audio signal level of the reception data 25 is higher than a predetermined value, the incoming audio signal 21 indicated as the reception data 25 delayed for a predetermined timing, but selecting, when the data enable signal 23 indicates that the value of the audio signal level of the reception data 25 is lower than the reference value, the adjusted pseudo noise as a reproduced signal 24.

Preferably, in the method of insertion of pseudo noise, the signal outputted at the step of comparing the signal level value of the measured audio signal with the reference value in magnitude and outputting a signal representing a result of the comparison is a binary signal which indicates that the level value of the measured audio signal is higher or lower than the reference value.

Preferably, in the method of insertion of pseudo noise, the predetermined timings at the step of delaying the output of the result of the comparison as a data enable signal 23 and at the step of delaying the reception data 25 at the receiver are equal to an interval for one sample.

According to another aspect of the present invention, there is provided a digital audio communication apparatus which includes a transmitter 10 and a receiver 11 and wherein an audio signal is transmitted intermittently only in an audible period in which sound is present and pseudo noise is inserted into a silent period interposed between an audible period and a next audible period of the audio signal to communicate the audio signal, said transmitter 10 comprising:
- a measuring circuit 1 for measuring a level of an incoming audio signal 21 and outputting a measured level value of the signal;
- a comparator 2 for comparing the result of measurement with a predetermined reference value in magnitude and outputting a signal representing a result of the comparison;
- a first delay circuit 3 for delaying the output signal of said comparator 2 for a predetermined timing and outputting the delayed signal as a data enable signal 23; and
- a first selector 4 for selecting, when the output of the comparator 2 indicates that the signal level value of the incoming audio signal is higher than the reference value, the incoming audio signal 21, but selecting, when the output of the comparator 2 indicates that the signal level value of the incoming audio signal 21 is lower than the reference value, the incoming audio signal 21 indicating the lower level and outputting the selected value as transmission data 22; and said receiver 11 comprising:
- a holding circuit 5 for receiving the transmission data 22 from said transmitter 10 as reception data 25 together with a data enable signal 23 and holding the reception data 25 at a time when the data enable signal 23 turns to the signal indicating lower level value;
- a noise generator 6 for generating a pseudo noise signal;
- an attenuator 7 for adjusting a level of the generated pseudo noise signal to a predetermined noise level corresponding to the reception data 25 held in said holding circuit 5 for the timing selected at the lower level;
- a second delay circuit 8 for outputting the reception data 25 delaying for the predetermined timing; and
- a second selector 9 for selecting, when the data enable signal 23 indicates that the value of the audio signal level of the reception data 25 is high, the reception data 25 which is delayed by the second delay circuit, but selecting, when the data enable signal 23 indicates low, the pseudo noise signal inputted from said attenuator 7 and outputting the selected value as a reproduced signal 24.

BRIEF DESCRIPTION OF THE DRAWINGS

FIG. 3 is a sequential diagram illustrating signals in the digital audio communication apparatus of FIG. 2, and wherein FIG. 3(a) illustrates digital incoming audio signal 21, FIG. 3(b) illustrates the output of level measuring circuit 1, FIG. 3(c) illustrates the output of comparator 2, FIG. 3(d) illustrates the output of first delay circuit 3, FIG. 3(e) illustrates the output of first selector 4, FIG. 3(f) illustrates the output of holding circuit 5, FIG. 3(g) illustrates the output of second delay circuit 8, and FIG. 3(h) illustrates the output of second selector 9; and FIG. 4 is a waveform diagram of signals in a digital audio communication apparatus, and wherein

DESCRIPTION OF THE PREFERRED EMBODIMENT

An embodiment of the present invention is described below with reference to the drawings.

Figure 1:
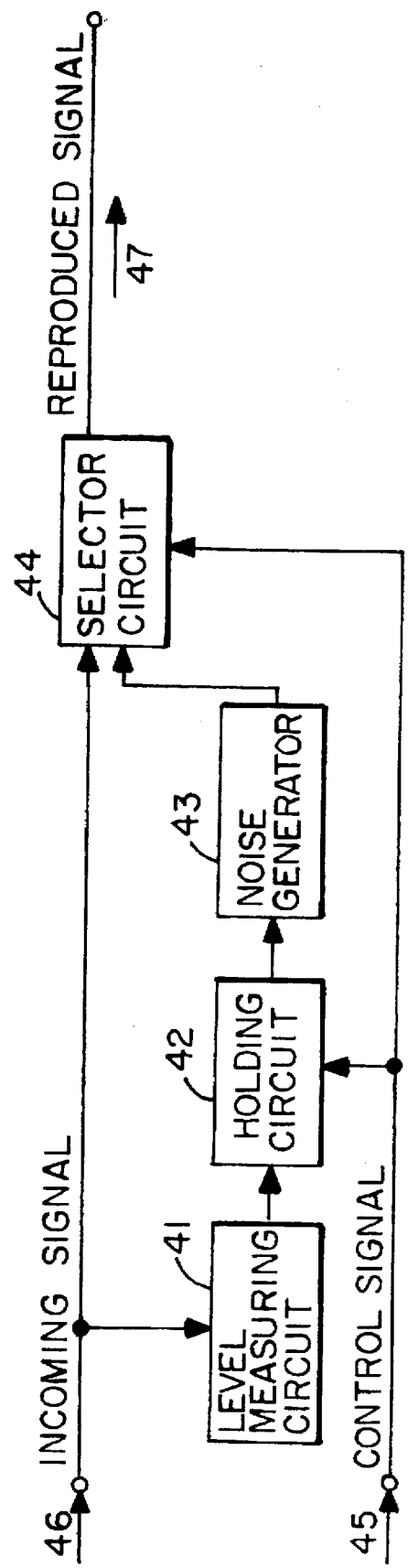
FIG. 1 is a block diagram of a conventional example of a receiver of a digital audio communication apparatus.
Figure 2:
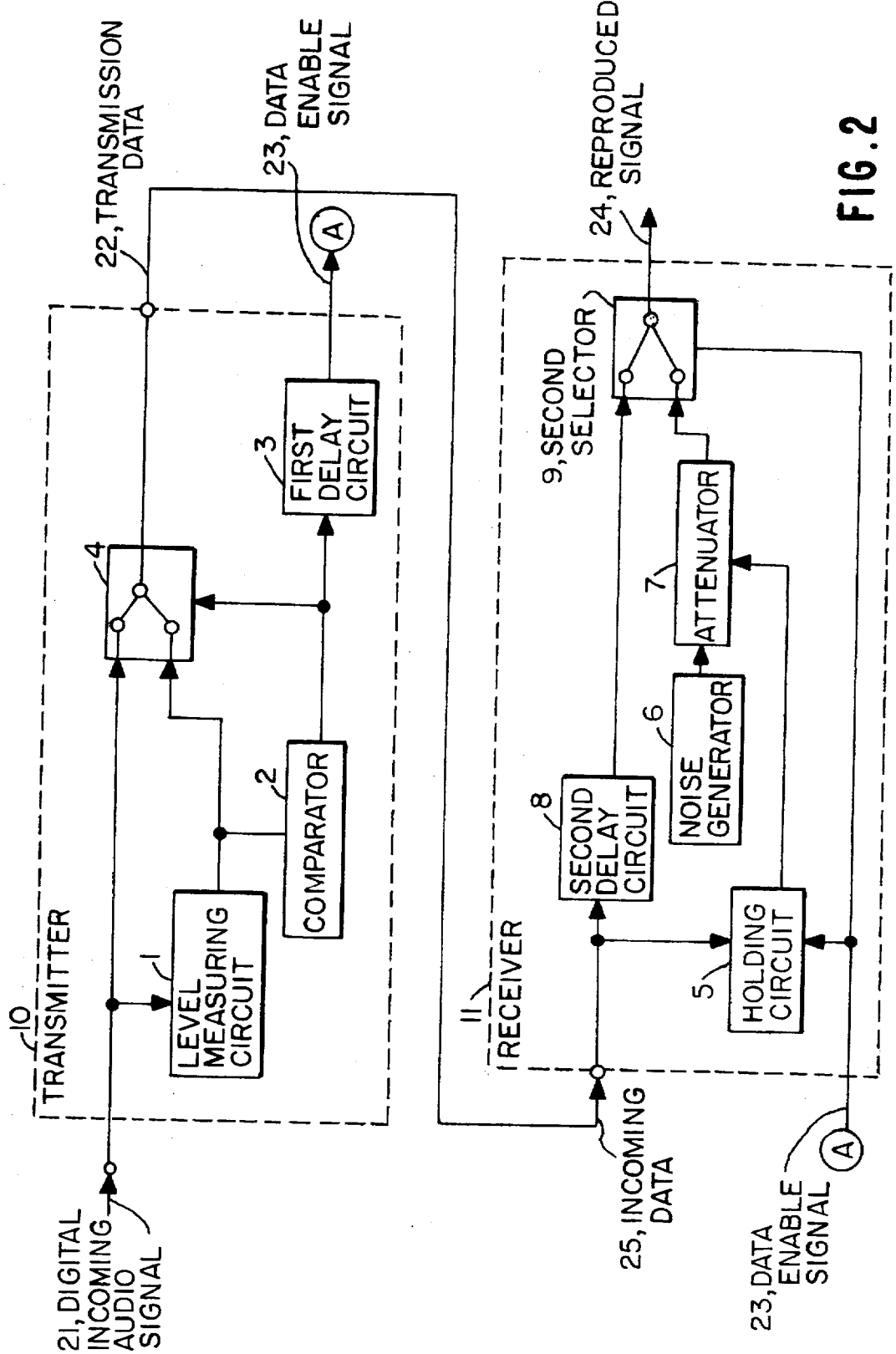
FIG. 2 is a block diagram of an embodiment of a digital audio communication apparatus of the present invention.
Figures 4A, 4B:
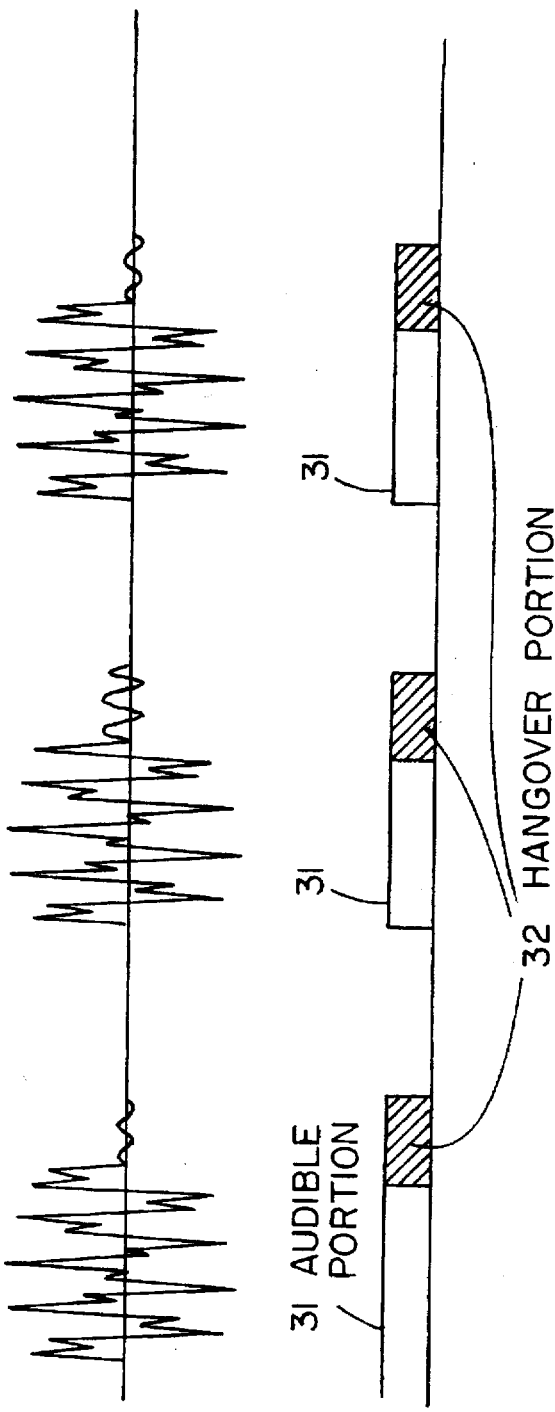
FIG. 4(a) illustrates a digital incoming audio signal.
FIG. 4(b) illustrates a control signal.

FIG. 2 is a block diagram of an embodiment of a digital audio communication apparatus of the present invention; FIG. 3 is a sequential diagram illustrating signals in the digital audio communication apparatus of FIG. 2, and wherein FIG. 3(a) illustrates digital incoming audio signal 21, FIG. 3(b) illustrates the output of level measuring circuit 1, FIG. 3(c) illustrates the output of comparator 2, FIG. 3(d) illustrates the output of first delay circuit 3, FIG. 3(e) illustrates the output of first selector 4, FIG. 3(f) illustrates the output of holding circuit 5, FIG. 3(g) illustrates the output of second delay circuit 8, and FIG. 3(h) illustrates the output of second selector 9; and FIG. 4(a) illustrates the waveform of a digital incoming audio signal and FIG. 4(b) illustrates the waveform of a control signal.

The digital audio communication apparatus includes transmitter 10 and receiver 11. Transmitter 10 includes level measuring circuit 1, comparator 2, first delay circuit 3 and first selector 4. Receiver 11 includes holding circuit 5, noise generator 6, attenuator 7, second delay circuit 8 and second selector 9.

In transmitter 10, level measuring circuit 1 inputs digital incoming audio signal 21 illustrated in FIG. 3(a) and calculates an audio signal level of digital incoming audio signal 21, and then outputs output data illustrated in FIG. 3(b). In a data train of digital incoming audio signal 21 of FIG. 3(a), Vn (n is an integer: n>=0) individually represent one word. Meanwhile, in a data train of the output of level measuring circuit 1 of FIG. 3(b), Dn (n is an integer: n>=0) represent the value of the input audio signal level at individual timings.

Comparator 2 is of the hysteresis type and compares output data from level measuring circuit 1 with a value defined in advance to make a distinction between an audible period and a silent period. Then, comparator 2 outputs the result of the discrimination as 0 or 1. In this instance, when an audible period is discriminated, 1 (a high level) is outputted from comparator 2, but when a silent period is discriminated, 0 (a low level) is outputted from comparator 2. The output of comparator 2 exhibits such a waveform as seen in FIG. 3(c).

First delay circuit 3 inputs the output of comparator 2, makes it delayed for one sample interval and outputs it as data enable signal 23 as shown in FIG. 3(d).

First selector 4 inputs the output of comparator 2 as a control input thereto. When the output of comparator 2 is 0 (at a low level), that is, when a silent period is discriminated, first selector 4 selects the level of the value indicated by the output of level measuring circuit 1 and outputs the level as transmission data 22. However, when the output of comparator 2 is 1 (at a high level), that is, when an audible period is discriminated, first selector 4 selects digital incoming audio signal 21 and outputs it as transmission data 22.

Referring to the relationship between the output of comparator 2 illustrated in FIG. 3(c) and the output of first selector 4 illustrated in FIG. 3(e), although digital incoming audio signal 21 is selected as the output of first selector 4 until data of word V11 of FIG. 3(a), data after word V12 are not selected, but the output of level measuring circuit 1 beginning with word D12 is selected instead. As a result, data illustrated in FIG. 3(e) are outputted as transmission data 22.

In this manner, on the transmission side, when digital incoming audio signal 21 indicates an audible period, digital incoming audio signal 21 is outputted as transmission data 22, and outputs a signal having the signal level which is outputted by level measuring circuit 1 as transmission data 22 right after an audible period of incoming audio signal 21 is turned into a silent period. However, since data enable signal 23 is delayed by a one sample interval from the output of comparator 2 as shown in FIG. 3(d), transmission data 22 and data enable signal 23 to be transmitted to the reception side have such a relationship that data enable signal 23 is turned to 0 (a low level) right after high level data denoted by D12 are added one sample to the last portion of audible data of transmission data 22.

In receiver 11, holding circuit 5 inputs reception data 25, that is, transmission data 22 per se of transmitter 10, and data enable signal 23 from transmitter 10, and holds incoming data 25 at a time when data enable signal 23 turns from 1 (a high level) to 0 (a low level) as seen in FIG. 3(d). In particular, in this instance, the data of word D12 illustrated in FIG. 3(e) is held by holding circuit 5.

Noise generator 6 generates and outputs a pseudo noise signal. Attenuator 7 inputs pseudo noise signal N generated by noise generator 6 and outputs a noise signal of value N adjusted to the predetermined pseudo noise level or the silent period set by incoming data 25 held in holding circuit 5 as shown in FIG. 3(f).

Second delay circuit 8 inputs and delays incoming data 25 one sample interval, that is, one word interval as shown in FIG. 3(g) and outputs the delayed data.

Second selector 9 inputs data enable signal 23 as a control input thereto. When data enable signal 23 is 1 (at a high level), that is, when transmission data 22 indicate an audible period, second selector 9 selects the output of second delay circuit 8, that is, the incoming data delayed one word interval, but when data enable signal 23 is 0 (at a low level), that is, when transmission data 22 indicates a silent period, second selector 9 selects the output of attenuator 7, that is, in this instance, selects pseudo noise signal N, and outputs the selected signal as reproduced signal 24 as seen in FIG. 3(h).

When reproduced signal 24 outputted from second selector 9 indicates an audible period, a signal in an audible portion of digital incoming audio signal 21 is reproduced, but when reproduced signal 24 indicates a silent period, that is, when no talking is detected, an appropriate pseudo noise level equal to the noise level of the transmission side is reproduced.

With the digital audio communication apparatus, although the receiver does not include signal processing hardware for measuring the audio level, a noise signal of an appropriate level is reproduced, and consequently, the digital audio communication apparatus does not impart, in a silent period, a disagreeable feeling to a communicating person's sense of hearing.

What is claimed is:

1. A method of insertion of pseudo noise for a digital audio communication apparatus which includes a transmitter (10) and a receiver (11) and wherein an audio signal is transmitted intermittently only in an audible period in which sound is present and pseudo noise is inserted into a silent period interposed between an audible period and a next audible period of the audio signal to communicate the audio signal, comprising the steps performed by said transmitter (10) of:

measuring a level of an incoming audio signal (21) and outputting a measured level value;

comparing the measured level value with a predetermined reference value in magnitude and outputting a resultant signal of the comparison and selecting the incoming audio signal (21) as a selected value when the resultant signal of the comparison indicates that the measured level value is higher in magnitude than the predetermined reference value; but selecting, the value of the incoming audio signal (21) as the selected value and outputting the selected value as transmission data (22) when the resultant signal of the comparison indicates that the measured level value is lower in magnitude than the predetermined reference value;

delaying said resultant signal of the comparison by a predetermined time and outputting the delayed resultant signal of the comparison as a data enable signal (23); and the steps performed by said receiver (11) of:

receiving the transmission data (22) from said transmitter (10) as reception data (25) together with said data enable signal (23) and holding the reception data (25) at a time when the data enable signal (23) changes from a signal indicating that the measured level value is higher in magnitude than the predetermined reference value to a signal indicating that the measured level value is lower in magnitude than the predetermined reference value;

generating a pseudo noise signal;

adjusting a level of the generated pseudo noise signal to a predetermined pseudo noise level;

delaying the reception data (25) for a predetermined time interval; and selecting the reception data (25) delayed for the predetermined time interval when the data enable signal (23) indicates that the measured level value is higher in magnitude than the predetermined reference value; but selecting the adjusted pseudo noise signal as a reproduced signal (24) when the data enable signal (23) indicates that the measured level value is lower in magnitude than the predetermined reference value.

2. A method of insertion of pseudo noise as claimed in claim 1, wherein the data enable signal (23) outputted at the step of comparing the measured level value with the predetermined reference value in magnitude and outputting a data enable signal representing a result of the comparison is a binary signal which indicates that the measured level value is higher or lower in magnitude than the predetermined reference value.

3. A method of insertion of pseudo noise as claimed in claim 1, wherein the step of comparing the measured level value with a predetermined reference value includes delaying the output of the resultant signal of the comparison as a data enable signal (23) by a time interval for one sample and at the step of delaying the reception data (25) at the receiver the predetermined time interval is a time interval for one sample.

4. A method of insertion of pseudo noise as claimed in claim 2, wherein the step of comparing the measured level value with a predetermined reference value includes delaying the output of the resultant signal of the comparison as a data enable signal (23) by a time interval for one sample and at the step of delaying the reception data (25) at the receiver the predetermined time interval is a time interval for one sample.

5. A digital audio communication apparatus which includes a transmitter (10) and a receiver (11) and wherein an audio signal is transmitted intermittently only in an audible period in which sound is present and a pseudo noise is inserted into a silent period interposed between an audible period and a next audible period of the audio signal to communicate the audio signal, said transmitter (10) comprising:
- a measuring circuit (1) for measuring a level of an incoming audio signal (21) and outputting a measured level value of the signal;
- a comparator (2) for comparing the measured level value with a predetermined reference value in magnitude and outputting a resultant signal of the comparison;
- a first delay circuit (3) for delaying the resultant signal of the comparison of said comparator (2) by a predetermined time interval and outputting the delayed signal as a data enable signal (23); and
- a first selector (4) for selecting the incoming audio signal (21) as a first selected value when the resultant signal of the comparison indicates that the measured level value is higher in magnitude than the predetermined reference value but selecting the incoming audio signal (21) as a first selected value and outputting the first selected value as a transmission data (22) when the resultant signal of the comparison indicates that the measured level value is lower in magnitude than the predetermined reference value; and said receiver (11) comprising:
- a holding circuit (5) for receiving the transmission data (22) from said transmitter (10) as a reception data (25) together with said data enable signal (23) and holding the reception data (25) for the predetermined time interval when the data enable signal (23) changes to a signal indicating the measured level value is lower in magnitude than the predetermined reference value;
- a noise generator (6) for generating a pseudo noise signal;
- an attenuator (7) for adjusting a level of the generated pseudo noise signal to a predetermined noise level corresponding to the reception data (25) held in said holding circuit (5) for the predetermined time interval
- a second delay circuit (8) for delaying output of the reception data (25) by the predetermined time interval; and
- a second selector (9) for selecting the reception data (25) which is delayed by the second delay circuit as a second selected value when the data enable signal (23) indicates that measured level value is higher in magnitude than the predetermined reference value; but selecting the pseudo noise signal inputted from said attenuator (7) as the second selected value when the data enable signal (23) indicates that the measured level value is lower in magnitude than the predetermined reference value and outputting the second selected value as a reproduced signal (24).

* * * * *